J. M. W. Kitchen.
Fruit Jar.
No. 95,025. Patented Sep. 21, 1869.

Witnesses
Chas. Nida
O. Hinchman

Inventor
J. M. W. Kitchen
per M. Munn & Co.
attys

United States Patent Office.

J. M. W. KITCHEN, OF BROOKLYN, NEW YORK.

Letters Patent No. 95,025, dated September 21, 1869.

---

IMPROVEMENT IN FRUIT-JARS.

---

The Schedule referred to in these Letters Patent and making part of the same.

---

*To all whom it may concern:*

Be it known that I, J. M. W. KITCHEN, of Brooklyn, in the county of Kings, and State of New York, have invented a new and useful Improvement in Fruit-Jars; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention has for its object to improve the construction of fruit or preserve-jars, so as to make them simple in construction, and more convenient, reliable, and effective in use; and It consists in the spring-fastener, of peculiar construction, in combination with the cover and continuous lug of the jar, as will be hereinafter more fully described.

A represents the body of the jar, which is first moulded in the ordinary manner. The desired form is then given to the interior of the mouth and neck of the jar by means of suitable tools.

Figure 1:
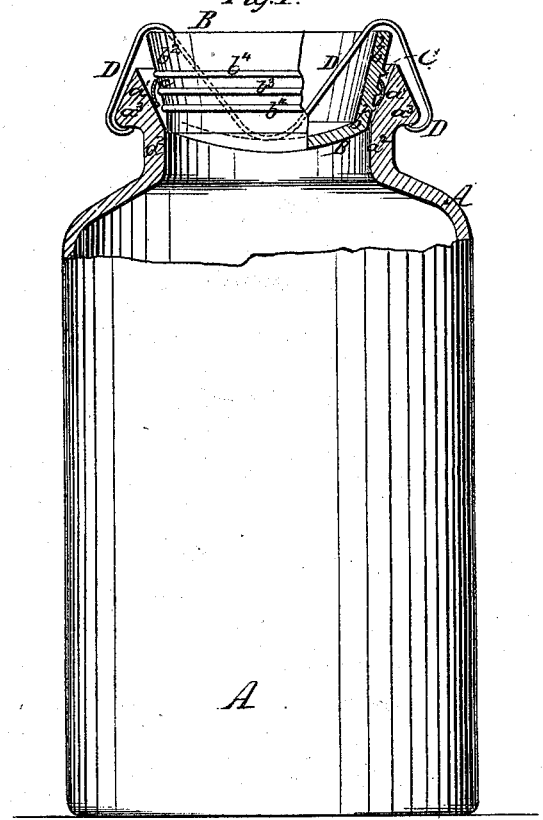
Figure 1 is a side view of my improved fruit-jar, partly in section, to show its construction.
Figure 2:
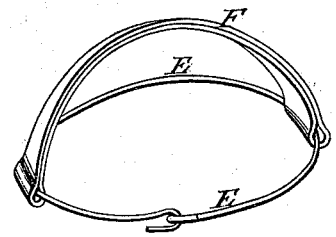
Figure 2 is a detail perspective view of a modified form of the spring-band or fastener.

The mouth $a^1$ is made conical or inclined, as shown in fig. 1, and the neck $a^2$, immediately below said conical mouth, is made vertical, as shown in fig. 1, to serve as a guide, to keep the cover in proper position as it moves down to its seat.

A ring of glass is then formed around the outside of the mouth of the jar A, as shown in fig. 1, to form a continuous lug, $a^3$, which is then shaped with suitable tools.

The inclined or conical mouth $a^1$ of the jar is ground with sand upon a conical core, so as to bring it to the exact form desired, as it is impossible to make it perfectly true with tools.

B is the cover, which is recessed or hollowed out upon its upper side, and rounded off upon its lower side or bottom, to allow the air or gas to more readily escape from the jar.

The lower part $b^1$ of the sides of the cover B is made straight, to serve, in connection with the straight surface $a^2$ of the neck of the jar, as a guide to keep the cover B in proper position when moving down to its place.

The upper part $b^2$ of the sides of the cover B is made inclined or conical, as shown in fig. 1, to correspond with the inclined or conical mouth $a^1$ of the jar A.

The joint between the conical part $b^2$, of the cover B, and the inclined mouth $a^1$, of the jar A, is made air-tight by the rubber packing-ring C, which is passed around the said inclined or conical part of the said cover, and the middle part of which is held out by a sharp ring-projection, $b^3$, formed around the said cover, as shown in fig. 1.

The rubber packing C is kept from getting out of place upon the cover B by two other lower ring-projections, $b^4$, formed around the said cover, the one above and the other below the projection $b^3$.

By this construction, as the heated contents of the jar cool, the cover B is forced down to its seat by the pressure of the atmosphere and of the spring D, either or both.

D is a spring-fastener, which is made in about the shape shown in fig. 1, and the middle part of which rests in the bottom of the recess, in the upper side of the cover B, as shown in fig. 1.

The ends of the spring-fastener D are sprung over the continuous lug $a^3$, so as to hold the jar closely sealed.

If desired, the spring-fastener may be made in other forms, as, for instance, in the form of an open ring, E, to hook around the neck of the jar A, below the continuous lug $a^3$, and which is provided with an elastic band or strap, F, to be sprung over the top of the cover B, to hold it securely in place, sealing the jar.

Having thus described my invention,

I claim as new, and desire to secure by Letters Patent—

The recessed cover B, having the parallel rings $b^3$ $b^4$ between its inclined upper and its straight lower portions, in combination with the inclined mouth $a^1$, vertical necks $a^2$, continuous lugs $a^3$, rubber packing C, and spring-fastening, all arranged as herein shown and described, for the purpose specified.

The above specification of my invention signed by me, this 20th day of April, 1869.

J. M. W. KITCHEN.

Witnesses:
FRANK BLOCKLEY,
JAMES T. GRAHAM.